United States Patent Office 2,801,177
Patented July 30, 1957

2,801,177

SHORTENING

Edwin S. Lutton, Cincinnati, Ohio, assignor to The Procter & Gamble Company, Cincinnati, Ohio, a corporation of Ohio No Drawing. Application June 11, 1954,
Serial No. 436,237

6 Claims. (Cl. 99—118)

This invention relates to plastic shortenings and particularly to plastic shortenings which are comprised essentially of a major proportion of a partially hydrogenated fat and a minor proportion of a substantially completely hydrogenated fat.

Vegetable shortenings of the prior art are noticeably deficient in their ability to withstand storage at temperatures of the order of 90° F. for a month or so without appreciable change in plasticity characteristics. Some types of shortening tend to stiffen or to become more firm and thus become more difficult to blend with other constituents in normal cake making procedures. Other types of shortening tend to become less firm and even soften to a pourable consistency and thereby lose desirable characteristics for intended use.

A principal object of my invention is to provide a shortening whose plasticity characteristics at any given temperature are not substantially changed on storage at high temperatures of the order of 90° F. for extended periods of time. Another object of my invention is to provide a plastic shortening which will not become unduly soft at temperatures of the order of 90–100° F., but which is not unduly hard or stiff at lower temperatures such as 50–60° F. A further object is to produce a plastic shortening which is characterized by improved performance in cake making, particularly with reference to the ease of working and the volume of cakes made therefrom.

In prior years, when cottonseed oil was available in sufficient quantity to meet the demand for plastic vegetable shortening, relatively few problems in the provision of a shortening which possessed desirable plasticity and performance characteristics were encountered. In this prior manufacture, 85% to 95% of cottonseed oil, hydrogenated to an iodine value of 75 to 85 (to insure resistance to oxidation) was used as "base stock" and was mixed with 15% to 5% of cottonseed oil which had been hydrogenated to an iodine value of about 10 and which was normally referred to as "hardstock." This mixture was then supercooled and agitated during initial crystallization of the higher melting constituents to plasticize it and to give a product of smooth consistency, subsequent crystallization being allowed to proceed without withdrawal of heat. The crystallized product, in the conventional operation, was then tempered at moderately elevated temperature such as 80° F., so as to improve stability of texture. Such products were of beta prime phase and possessed reasonable stability against change in plasticity characteristics on storage at elevated temperatures for long periods of time, although some stiffening or firming of the product was experienced.

The use of soybean oil to compensate for insufficient supplies of cottonseed oil in plastic shortening manufacture has led to difficulties in producing a plastic shortening product which is comparable in physical characteristics to that produced 100% from cottonseed oil. For example, the combination of a soybean oil base stock with a cottonseed oil hardstock has resulted in a shortening which has an even greater tendency than a corresponding 100% cottonseed oil product to develop firmness or a stiffer consistency at any given temperature when stored at temperatures of the order of 90° F. The solid constituents of such shortenings are for the most part in beta prime crystalline phase, although in some proportions an appreciable amount may exist in the beta, or higher melting, phase.

Experience has shown also that when soybean oil hardstocks are used with soybean oil base stocks the product is usually satisfactory but on occasions when exposed to somewhat higher temperatures than normal there is a complete loss of plastic quality, the shortening becoming "soupy" so that it can actually be poured from its container.

The existence of the solid constituent of plastic shortenings in the beta crystalline phase has been associated with greater fluidity in solid-liquid fat mixtures and consequently shortening manufacturers have deliberately avoided as much as possible the use of raw materials which, when used in plastic shortening manufacture, tended to develop the beta crystalline phase under storage conditions which included periods of storage at temperatures of the order of 80–95° F.

In accordance with the present invention raw materials having strong tendency toward beta crystal formation can be employed in the manufacture of plastic shortening products which are not only more stable toward change in plasticity characteristics on storage at high temperature, but also which exhibit superiod characteristics from the standpoint of better consistency at higher temperatures and better performance in cake making processes.

I have discovered that by the proper choice of oils and fats which are high in their content of combined $C_{18}$ fatty acid, as more fully hereafter described, for use both as base stock and hardstock, it is possible to achieve the objects of my invention and produce a plastic shortening whose solid constituent is in the beta crystalline form and which possesses the superior plasticity and performance characteristics aforementioned.

For a definition of the beta, beta prime and other polymorphic forms in which triglycerides may crystallize, reference can be made to an article entitled "Review of the Polymorphism of Saturated Even Glycerides" by E. S. Lutton, published in the Journal of The American Oil Chemists' Society, volume 27, page 276 (1950).

In the preparation of the stable beta phase shortenings of my invention, it is essential that a substantial amount of the higher melting constituents be crystallized in the beta phase during the initial stages of chilling and plasticizing, or that conversion to the beta crystalline form be effected within a relatively short time thereafter by tempering. In order that this may be achieved I have found that only glycerides having strong beta tendencies can be employed in the production of the plastic shortening products herein described and claimed. Thus, it is essential to choose for base stock manufacture a glyceride whose combined fatty acids are constituted by not substantially less than 87% of $C_{18}$ fatty acids. Similarly the hard stocks used in the practice of my invention are derived from glycerides whose combined fatty acid constituents are constituted by not substantially less than 90% of $C_{18}$ fatty acids. As used in the specification and claims, the percent $C_{18}$ fatty acid content means the percent of $C_{18}$ saturated and unsaturated fatty acid based on the total fatty acid combined in the glyceride or mixture of glycerides.

The suitability of various oils for use in the practice of the present invention will be evident from the following list setting forth the typical $C_{18}$ content of some of the more common vegetable oils available for use in the manufacture of plastic shorteining. It will be observed that peanut oil and cottonseed oil, because of their relatively low $C_{18}$ fatty acid content, cannot be employed alone in the manufacture of plastic shortenings having the characteristics of the plastic shortenings of the present invention. However, small amounts can be tolerated in admixture with other oils, provided the total amount of $C_{18}$ fatty acid present in the glyceride mixture is within the limits set forth above.

| Oil | Percent $C_{18}$ Fatty Acid Content |
|---|---|
| Sunflower seed | 94.5 |
| Safflower seed | 93.5 |
| Linseed | 93 |
| Sesame | 90 |
| Corn | 89 |
| Soybean | 88.5 |
| Peanut | 85 |
| Cottonseed | 72 |

Generally speaking, the procedure for plasticizing or converting the mixture of hardstock and base stock into plastic form is not substantially different from the well known conventional process. In carrying out this step on shortenings of the present invention the following procedures are customary.

The stock mixture is melted and held in a feed tank at about 130° F. The melted stock is pumped through a refrigerated tube equipped with an internal scraping agitator. This device is similar to that described in Reissued Patent No. 21,406, granted March 19, 1940 to Clarence W. Vogt, and is hereinafter referred to as a "freezer" or "continuous freezer." The cooled shortening issues from the refrigerated tube at a temperature of 60° F. to 70° F. in a super cooled condition. It is then passed through a similar tube (sometimes called a picker box) without refrigeration. The heat of crystallization brings the temperature of the shortening up to about 75° to 85° F. during the passage through the second tube and associated piping. The shortening is then run into the containers. A further temperature rise of 1° to 3° F. takes place in the container. The containers of shortening are then "tempered," i. e., held for one or two days at substantially constant temperature. This temperature is not lower than the temperature reached by the shortening as it undergoes the temperature rise after filling. This holding of the shortening, commonly called tempering, is done to assure stabilization of crystal structure, and with beta prime shortenings of the prior art it has been carried out at about 80° to 85° F. It is desirable to hold the shortening of my invention at a somewhat higher temperature, such as about 90° F., thereby insuring that all of the solid shall be rapidly obtained in the beta phase. Preferably tempering is initiated within about 12 hours after plasticizing and continued for not less than about 48 hours.

All the other steps of processing are carried out within the range of values outlined above for conventional shortenings. On of the tests for determining relative consistency of plastic shortening products is the penetration test. Such determinations of this test as are referred to in the examples which follow were made with the aid of an A. S. T. M. grease penetrometer according to A. S. T. M. method D 217-52T. All of the penetrations were determined at 70° F. on shortening held for 1 day at 70° F. Prior to the 70° F. holding and testing, the shortening may have been held for periods — never less than 24 hours — at temperatures above 70° F.

Beta prime shortenings are commonly tested for consistency as determined by penetration after tempering for two days at 80° F. and holding for 1 day at 70°. This corresponds fairly closely to commercial practice. The shortenings of my invention should be tempered in practice at about 90° F. For this reason the penetration of beta shortening by which the consistency is judged will be those taken after 90° F. tempering, and then holding 1 day at 70° F.

The preferred range for penetrations is 180 to 200 A. S. T. M. units, but products with values between 160 and 220 are quite usable, and for use in a warm bake shop with powered mixing devices, the penetration may be as low as 140.

The workability test is really the first step in a one bowl or quick method cake. This procedure is described in the Good Housekeeping "Cake Cookbook" p. 6, copyright 1952 Hearst Magazines Inc. and in "Better Baking" booklet 1312T prepared by the Home Economics Dept. Procter & Gamble p. 5. A suitable recipe is chosen and the flour, sugar, shortening, and water (or milk) are added to the bowl of the mixer in the ratios called for by the recipe. The mixer is started and the number of revolutions required to disperse the shortening is noted. A standard commercial shortening is tested in the same manner as a reference.

In the receipe employed to test the workability of the shortenings of the present invention, a commercial vegetable hydrogenated shortening with a good sales record required 100 revolutions, when tested fresh from the factory. When purchased from stores after a period of standing on the shelf, this same brand of shortening has frequently been found to require as many as 180 revolutions to disperse the shortening. With this receipe then, any test under 100 revolutions is to be regarded as good, and a test up to 180 revolutions is acceptable. 140 revolutions may be taken as a mean value.

*Example 1.*—Composition—both hard stock and base stock were refined, bleached and hydrogenated sunflower seed oil, 8 parts by weight of hard stock of 1 iodine value and 92 parts by weight of base stock of 82 iodine value. This mixture was melted and fed to a continuous freezer and issued at 66° F. The product was packed in standard cans and held 2 days at 90° F. and one day at 70° F. The penetration was 183. Still another portion was held for one month at 90° F., then one day at 70° F., and its penetration was 180. The workability on the sample held 1 month, at 90° F. in revolutions to incorporate fat, was 72.

*Example 2.*—The same materials employed in Example 1 were used except that 10% of the hard stock and 90% of the base stock were admixed. This mixture processed through the continuous freezer and issued at a temperature of 66° F. The product was packed in standard cans. One portion was held two days at 90° F. and one day at 70° F. The penetration was 177. A portion was held for 1 month at 90° F. and 1 day at 70° F. The penetration was 175. The workability of the sample was 80 in terms of revolutions to incorporate the fat.

*Example 3.*—This preparation was made with hard stock from refined and bleached sunflower seed oil hardened to an iodine value of 1 and with base stock from refined and bleached soybean oil hydrogenated to 81 iodine value.

Ten parts by weight of hard stock and 90 parts by weight of base stock were mixed, melted, and processed through the continuous freezer. A number of standard cans were filled with the shortening. After two days at 90° F. and one at 70° F. the penetration was 186. After one month at 90° F. and one day at 70° F. the penetration was still 186.

*Example 4.*—In this preparation the hard stock was refined and bleached sunflower seed oil hardened to an iodine value of 1. The base stock was refined and bleached soybean oil hardened to an iodine value of 90.

Ten parts of hard stock and 90 parts of base stock were melted and held at 140° F. The mixture was fed to a continuous freezer and issued at 65° F. The shortening was packed in standard cans. The penetration after 2 days at 90° F., and 1 day at 70° F. was 177. After 1 month at 90° F., and 1 day at 70° F., the penetration was 182. The workability of the product held for 1 month at 90° F. was 82 revolutions to disperse the shortening.

These examples may be summarized as follows:

| | Initial Penetration 90/70 | 1 mo. at 90 | |
|---|---|---|---|
| | | Pen./70 | Workability Revolutions to Incorporate Shortening |
| Example 1: | | | |
| 8% sunflower 1 I. V. | } 183 | 180 | 72 |
| 92% sunflower 82 I. V. | | | |
| Example 2: | | | |
| 10% sunflower 1 I. V. | } 177 | 175 | 80 |
| 90% sunflower 82 I. V. | | | |
| Example 3: | | | |
| 10% sunflower 1 I. V. | } 186 | 186 | |
| 90% soybean 81 I. V. | | | |
| Example 4: | | | |
| 10% sunflower 1 I. V. | } 177 | 182 | 82 |
| 90% soybean 90 I. V. | | | |

For comparison a commercial shortening at a 70° penetration of 187 requires 140 revolutions to effect incorporation.

It will be observed that the penetration tests of all of the shortenings are within the usable range and within or very close to the preferred range.

The workability—revolutions to incorporate fat—after storage for 1 mo. at 90° F. is satisfactory.

In order to make my description clear I use the term "stock" to indicate the melted mixture of hard stock and base stock that is processed to make a plastic shortening.

There is a special characteristic of the stocks that can be used to make the shortenings of my invention that can be used to distinguish them from stocks that produce predominantly beta prime shortenings.

This special characteristic can be demonstrated by processing the stocks in the conventional manner through the conventional continuous freezer layout and dividing the containers holding the output into two portions. One portion is held for two days at 80° F., the other portion is held for two days at 90° F. Samples of each portion are subjected to the penetration test at 70° F. in the usual manner.

This test was carried out on the stocks used in Examples 1, 2, 3, and 4 and on the stock of a commercial shortening not composed of high $C_{18}$ fatty acids in the glycerides.

The results are tabulated below.

| | Penetration 80/70 | Penetration 90/70 |
|---|---|---|
| 1 | 147 | 183 |
| 2 | 155 | 177 |
| 3 | 160 | 186 |
| 4 | 145 | 177 |
| Commercial Shortening | 175 | 169 |

It will be noted that the plastic shortening made from the stock of a commercial shortening stiffened; that is had a lower penetration when held at 90° F. as compared with its 80/70 penetration, whereas the shortenings of my invention, that is, those tempered at 90° F. were softer than the shortening from the same stock held at 80° F.

The preferred range of stock composition of my beta shortening is that which causes the 70° F. penetration on shortening held two days at 90° F. to be at least 10 points higher than the 70° F. penetrations on shortening made from the same stock and held two days at 80° F.

Examples 3 and 4 show that soybean oil base stock can be used to achieve the preferred range of penetration—180 to 200—if the hard stock is 90% or more $C_{18}$ fatty acid.

For the base stock a mixture of oils may be used, provided the mixture contains not less than 87% $C_{18}$ fatty acids.

For comparison, an all soybean shortening was made.

The hard stock was 1 I. V. and the base stock 83 I. V. This was processed in the manner of Examples 1, 2, 3, and 4. The penetration 80/70 was 167 and the penetration 90/70 was 149. This is clearly not a typical beta shortening as here described, for the 90/70 penetration was 33 points lower than the 80/70 penetration. I do not consider a shortening made with soybean oil hard stock and soybean base stock to be usable to produce the shortening of my invention.

The extent of hydrogenation of the base stock is very important to secure beta phase shortening. A series of small samples was made with 10% of hard stock of 1 iodine value sunflower seed oil and 90% of base stock of sunflower seed oil. The iodine values of the base stock were 135, 101, 89, 84 and 77. These were melted, chilled and examined for beta phase by X-ray diffraction. It was observed that when the base stock was below 80 iodine value no beta phase crystals were formed, while at 89 iodine value about 40% of the solids in the specimen crystallized in the beta phase.

To confirm this small sample work a series of shortenings was made with sunflower seed oil. In this series the hard stock was of 1 iodine value, the base stock was 90, 82, or 77. The shortenings with 90 and 82 iodine value base stock showed beta shortening behavior on storage for 1 month at 90° F.; that is, they did not stiffen up to any marked extent, but the shortening with the 77 iodine value base was a typical beta prime type, stiffening up from a 162 penetration to a 147 penetration. Thus, with sunflower seed oil for both base and hard stock, the beta-forming tendency persists down to base stock iodine value of about 82.

With high percentage of $C_{18}$ fatty acid in the hard stock (above 90%), 85 iodine value for the base stock is considered a good compromise between beta forming properties and keeping quality, although some base stocks will require less hydrogenation than this because of their beta prime tendencies and others will readily permit of hydrogenation to 80 I. V. It is desirable to have the iodine value low to insure keeping quality. While it is easier to produce shortenings with beta phase solids with high iodine value base stocks I believe the upper limit of iodine value that will keep in a non-rancid condition during commercial handling is about 95.

The reasons that the base stock cannot be hydrogenated to any desired iodine value, as for instance 70, are not precisely known but it is thought that the presence of glycerides containing isomers of oleic acid, known to be formed in hydrogenation, have a tendency to limit beta phase formation. Linseed oil, for instance, with its high initial iodine value cannot be hardened by known practical methods to as low an iodine value as required for good keeping quality in a base stock and retain its beta forming character.

The shortenings of my invention have improved performance over other vegetable shortenings in cake making. I compared the cake making qualities of the beta shortening of my invention with a commercially available hydrogenated vegetable oil shortening of the usual beta prime characteristics. Since the beta prime hydrogenated vegetable oil shortening employed contained 4½ parts of the same fat, superglycerinated to form mono- and diglycerides, to 100 parts of triglycerides, I added to each 100 parts of my preparation 4½ parts of the same superglycerinated fat. This superglycerinated fat was produced from a mixture that was essentially 80% soybean oil, 20% cottonseed oil, hydrogenated to a base stock iodine value and then superglycerinated. It was about 85% $C_{18}$ fatty acids. Thus the addition of the 4½% of superglycerinated fat lowered the $C_{18}$ content of the shortening by less than 0.5%. This superglycerinated fat, containing mono-, di- and triglycerides, was made according to U. S. Patent 2,206,167, granted July 2, 1940. The shortenings were all plasticized through a laboratory continuous freezer, tempered alike and compared in a standard quick method white cake recipe. This recipe is given on page 53 of the booklet "New Recipes for Good Eating," copyrighted in 1951 by The Procter and Gamble Company.

It will be appreciated that the number values obtained in a test of this type are dependent upon the flour and egg quality. When a batch of flour is used up and the use of another started there is a shift in numerical value. Likewise there is a change in egg quality with seasons. For this reason, it is necessary to run a sample of a commercial vegetable shortening of standard quality as a comparison.

*Example 5*

| Shortening used | Cake vol. cc. per lb. (mean of 2 tests) |
|---|---|
| Beta prime commercial Hydrogenated vegetable | 1,348 |
| 8½ parts of linseed oil of 1 I. V.<br>91½ parts of soybean oil hydrogenated under 100# pressure to 86 I. V.<br>4½ parts superglycerinated fat | 1,374 |

It will be noted that the cake volumes of the shortening of my invention were higher than that from the commercial shortening. The difference is not of great magnitude but it is noticeable and has been verified by many tests.

Although the above example contained linseed oil hard stock and the earlier examples sunflower seed oil hard stock it is not essential that a single oil be used; a mixture may be used, if it contains not less than 90% $C_{18}$ fatty acids.

It will be apparent that the invention may be susceptible to variations, by those skilled in the art, and such variations are intended to be included in the invention.

I claim:

1. A plastic shortening comprising principally vegetable oils, comprising a hard stock containing not less than 90% of $C_{18}$ fatty acid radicals in the fatty acids present as triglycerides, said hard stock having an iodine value less than 10 and constituting a minor portion of the shortening, the major portion of the shortening being a partially hydrogenated base stock containing not less than 87% of $C_{18}$ fatty acid radicals in the fatty acids present as triglycerides, said base stock being not over about 95 iodine value and not less than about 80 iodine value, the crystalline solids of said shortening being predominantly in the beta phase.

2. The shortening of claim 1 in which the hard stock is derived from an oil taken from the group consisting of sunflower seed oil, safflower seed oil, linseed oil, sesame seed oil, corn oil, and soybean oil and mixtures thereof, said oils and said mixtures containing not less than 90% of $C_{18}$ fatty acids.

3. The shortening of claim 2 in which the base stock is derived from an oil taken from the group consisting of sunflower seed oil, safflower seed oil, sesame seed oil, corn oil, soybean oil, and from mixtures of oils of the group consisting of sunflower seed oil, safflower seed oil, sesame seed oil, corn oil, soybean oil, peanut oil, and cottonseed oil, said oil and said mixtures containing not less than 87% $C_{18}$ fatty acids.

4. A plastic shortening comprising a hard stock containing not less than 90% of $C_{18}$ fatty acid radicals present as triglycerides, said hard stock having an iodine value less than 10 and constituting a minor portion of the shortening, the major portion of the shortening being a partially hydrogenated soybean oil base stock, said base stock being not more than about 95 iodine value and not less than 80 iodine value, the crystalline solids of said shortening being at least 90% in the beta phase.

5. A plastic hydrogenated vegetable shortening comprising a minor proportion of a hard stock of an iodine value less than 10 with a $C_{18}$ fatty acid content not less than 90%, and a major proportion of a base stock of an iodine value not more than 95 and not less than 80, said base stock having not less than 87% $C_{18}$ fatty acid content, said shortening having been tempered, said tempering being commenced within about 12 hours after plasticizing, and continuing for not less than about 48 hours at about 90° F., to effectuate crystallization in the beta phase of at least 90% of the solid constituent of the shortening.

6. The shortening of claim 1 with an iodine value of less than 90, with a penetration at 70° F. between 140 and 220 and with the solid portion existing at least 95% in the beta phase, after plasticizing and tempering; being characterized by a 70° F. penetration after two days tempering at 90° F., which is at least 10 points higher than a 70° F. penetration of shortening made from the same stock after two days tempering at 80° F.

References Cited in the file of this patent

UNITED STATES PATENTS

| 1,547,571 | Ellis | July 28, 1925 |
| 2,154,452 | Jenness | Apr. 18, 1939 |
| 2,521,219 | Holman et al | Sept. 5, 1950 |